Figure 1:
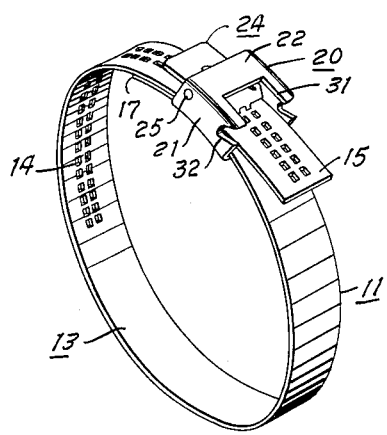

July 19, 1966   C. H. SCARBOROUGH, JR   3,261,062
CLAMP ASSEMBLY FOR HOSE, PIPE AND OTHER ARTICLES
Filed March 23, 1964   2 Sheets-Sheet 1

INVENTOR
Clarence H. Scarborough, Jr.
BY *Ashley & Ashley*
ATTORNEYS

July 19, 1966  C. H. SCARBOROUGH, JR  3,261,062
CLAMP ASSEMBLY FOR HOSE, PIPE AND OTHER ARTICLES
Filed March 23, 1964  2 Sheets-Sheet 2

INVENTOR
Clarence H. Scarborough, Jr.

BY *Ashley & Ashley*

ATTORNEYS

United States Patent Office 3,261,062
Patented July 19, 1966

3,261,062
CLAMP ASSEMBLY FOR HOSE, PIPE AND
OTHER ARTICLES
Clarence H. Scarborough, Jr., Grand Prairie, Tex.,
assignor to Frank Holister Co., Inc., Dallas, Tex.,
a corporation of California
Filed Mar. 23, 1964, Ser. No. 354,000
5 Claims. (Cl. 24—19)

This invention relates to new and useful improvements in clamp assemblies for hose, pipe and other articles and more particularly to an adjustable clamp and actuating means therefor.

One object is to provide an improved clamp assembly having an adjustable clamp of the flexible band or strap type and novel means for positively securing the clamp in adjusted positions around hose, pipe and other articles while permitting quick release of said clamp.

A particular object of the invention is to provide an improved clamp assembly, of the character described, wherein a novel fastener is mounted on the band of the clamp for coacting with the longitudinally-extending perforations of said band to secure said clamp against displacement and is biased into engagement with said perforations and functions as a detent so as to facilitate tightening and loosening of said clamp.

An important object of the invention is to provide an improved clamp assembly, of the character described, wherein a housing is secured to one end portion of the clamp band for mounting the fastener thereon as well as for receiving the opposite perforated end portion of said clamp band and has means for coacting with an actuating tool to support said tool in engagement with the perforations of said clamp band for tightening and loosening the clamp.

Another important object of the invention is to provide an improved clamp assembly, of the character described, wherein the actuating tool includes a portion for mating engagement with the perforations of the clamp band and having biased connection with the remainder of said actuating tool so as to permit the application of a predetermined torque to said clamp band whereby the tightened band has sufficient tension to prevent accidental loosening and displacement of the clamp.

A further object of the invention is to provide an improved clamp assembly, of the character described, wherein the perforations of the clamp band are arranged in a plurality of parallel rows to prevent misalinement of the overlapping end portions of said clamp band upon tightening and loosening of the clamp as well as permit a more positive engagement of said perforations with the fastener of said clamp and the mating portion of the actuating tool.

A construction designed to carry out the invention will be hereinafter described, together with other features of the invention.

Figure 2:
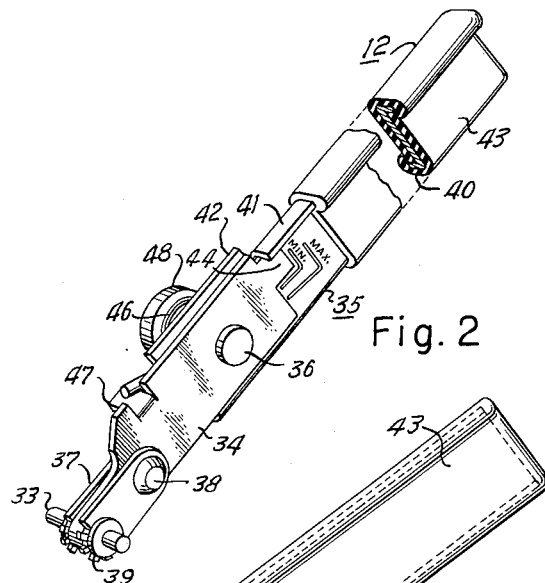
Figure 3:
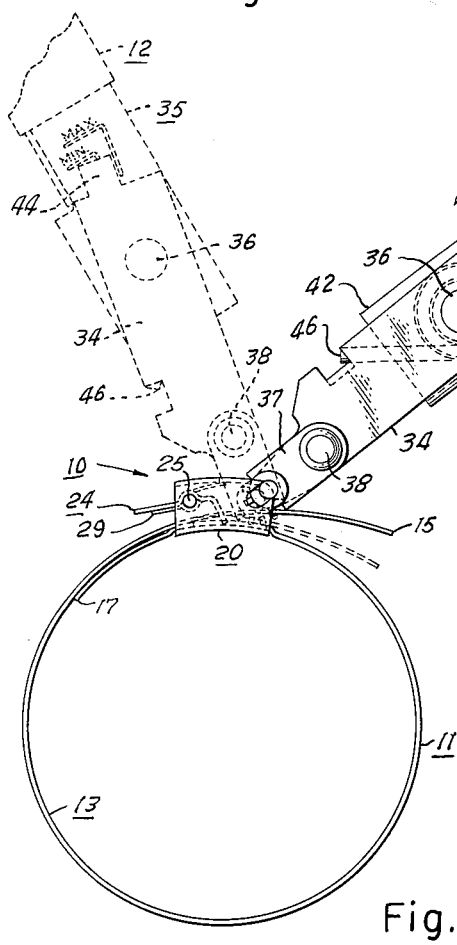
Figure 4:
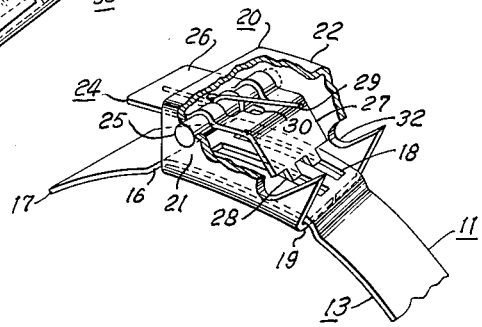
Figure 6:
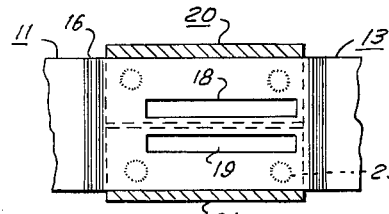
Figure 5:
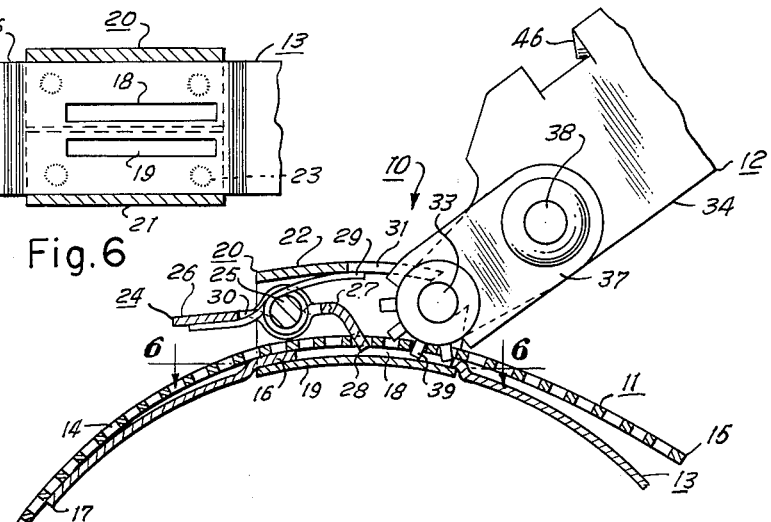
Figure 7:
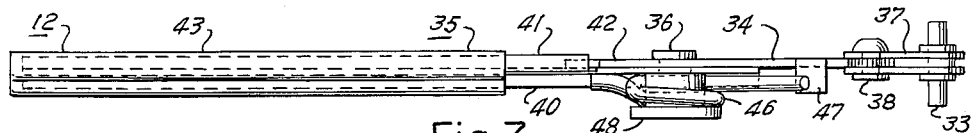
Figure 8:
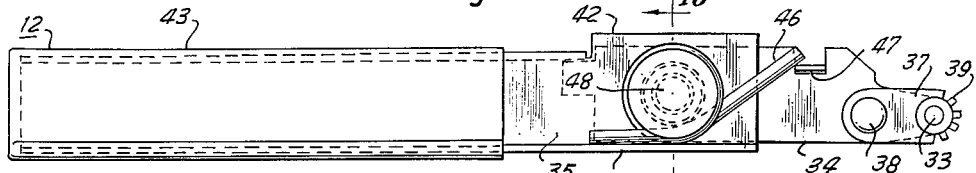
Figure 9:
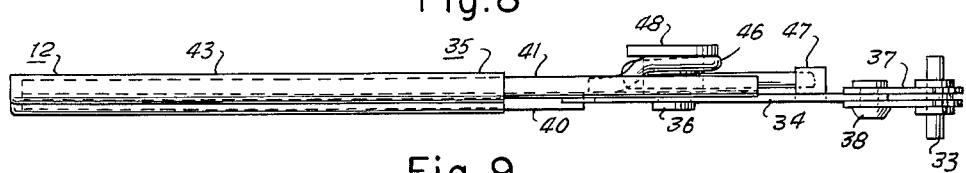
Figure 10:
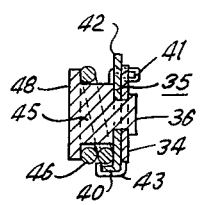

The invention will be more readily understood from a reading of the following specfication and by reference to the accompanying drawings, wherein an example of the invention is shown, and wherein:

FIG. 1 is a perspective view of the adjustable clamp of a clamp assembly constructed in accordance with the invention, FIG. 2 is a perspective view, partly broken, of the actuating tool of the clamp assembly for tightening and loosening of the clamp, FIG. 3 is a side elevational view of the clamp assembly showing the relationship of its clamp and tool upon initial engagement of the tool with the clamp, the relative movement of said tool during tightening or loosening of said clamp being shown in broken lines, FIG. 4 is an enlarged, perspective view of the end portion of the flexible band of the clamp having the fastener mounted thereon with the housing being partly broken away to show the relationship of said fastener to said band end portion and housing, FIG. 5 is an enlarged, longitudinal, sectional view of the overlapping end portions of the clamp showing the relationship of the fastener, housing and tool thereto, FIG. 6 is a sectional view, taken on the line 6—6 of FIG. 5, showing the longitudinal slots in the bottom wall of the housing, FIG. 7 is a top plan view of the actuating tool, FIG. 8 is a side elevational view of the tool, FIG. 9 is a bottom plan view of the tool, and FIG. 10 is a transverse, sectional view taken on the line 10—10 of FIG. 8.

In the drawings, the numeral 10 designates a clamp assembly embodying the principles of the invention and having an adjustable clamp 11 and an actuating tool 12 for tighening and loosening the clamp. The latter includes a flexible band or strap 13, of metal or other suitable material, having a plurality of equally-spaced openings or perforations 14 in one end portion 15 thereof arranged in a pair of parallel rows extending longitudinally of the medial portion of the band. Preferably, the perforations 14 are rectangular and the rows thereof are of sufficient length to permit the band 13 to be clamped around hose, pipe and other articles of different circumferences or girths. An outwardly-offset seat portion 16 is provided adjacent and spaced from the opposite end 17 of the clamp band and has a pair of parallel, elongated openings or slots 18 extending longitudinally and medially thereof (FIGS. 4–6). The seat portion 16 may be slightly arced to conform to the complementary, underlying base or bottom wall 19 of an open-ended, rectangular enclosure or housing 20 having a pair of upstanding side walls 21 and a top wall 22 overlying and spaced from said seat portion. As shown by the dotted lines 23 in FIG. 6, the bottom wall 19 of the housing 20 is spot welded or otherwise secured to the seat portion of the clamp band.

The perforated end portion 15 of the clamp band 13 is adapted to overlap the end 17 of said band and extend through the housing 20 in overlying relation to the band seat portion 16 with its perforations 14 in registration with the slots 18 of the housing bottom wall 19 (FIG. 5). A fastener 24, in the form of an angular detent or pawl, is pivotally mounted in the housing on a pin 25 extending transversely between one of the ends of the side walls 21 of said housing in substantially parallel relation to the top and bottom walls thereof. The fastener 24 has an elongated, outer leg or upper portion 26 projecting from one end of the housing 20 and a short, inner leg or lower portion 27 extending at an obtuse angle to the outer leg toward the bottom wall of said housing. A pair of lugs or teeth 28 projects inwardly from the inner leg 27 of the fasetner for engagement with the perforations 14 of the clamp band, being rectangular in cross-section but of less dimensions than said perforations. The outer leg 26 of the fastener is slit and bent and offset at 29 for engagement around the pivot pin 25 and has openings 30 therein adjacent said pin for receiving a spring 30 which is wound around said pin with its end portions bearing against said leg and the top wall 22 of the housing.

As shown by the numeral 31, the end portion of the housing top wall opposite the pivot pin is cut away or recessed to accommodate the actuating tool 12. Upwardly and outwardly inclined slots or elongated openings 32 are formed in the ends of the housing side walls 21 opposite the pin 25 to receive the alined gudgeons or trunnions 33 of the actuating tool 12 which extend transversely of one end of said tool. The trunnions 33 are integral and are fixed to one end of a flat bar or member 34 which, in turn, is pivotally connected to one end of a handle 35 by a stepped rivet or pivot pin 36. Connecting links 37 overlie the opposite sides of the outer end portion of the bar 34 and extend inwardly from the trunnions to a rivet 38 to prevent movement of said trunnions relative to said bar. Each link 37 has an arcuate series of cogs or teeth 39 on its outer end for mating engagement with the complementary perforations 14 of the clamp band 13 and, as shown in FIG. 5, the teeth are of a length greater than twice the thickness of said clamp band so as to extend through the slots 18 as well as said perforations and impart movement to the band end portion 15 relative to the band end 16 when the tool 12 is oscillated relative to the clamp 11.

The handle 35 is in the form of an elongate flat bar or member having a lateral, reinforcing flange 40 coextensive with its lower longitudinal margin and directed away from the bar 34. An opposed reinforcing flange 41 projects laterally from the upper longitudinal margin of the handle toward the bar 34 and extends from its outer end to said bar, at which point it becomes coplanar with said handle as shown by the numeral 42 (FIGS. 2 and 3). Preferably, the handle 35 and its flanges 40 and 41 have the major portions thereof encased in a sheath 43 of rubber, plastic or other suitable material. Although the stepped rivet 36 pivotally connects the bar and handle, relative movement therebetween is limited by a lug or projection 44 which extends from the inner end of said bar adjacent and beneath the upper flange 40 of the handle.

As shown in FIG. 10, the stepped rivet has an enlarged, annular portion or shoulder 45 overlying the side of the handle 35 opposite the bar 34 and coacting with the peened end of said rivet to confine said handle and bar therebetween. A torsion spring 46 encircles the shoulder 45 with one of its ends bearing against the lower flange 40 of the handle and the other of its ends bearing against the upper surface of a lug or tab 47 struck and projecting laterally from the upper margin of the bar (FIGS. 2 and 3) so as to urge said bar counterclockwise relative to said handle. An enlarged head 48 on the outer end of the rivet 36 confines the torsion spring 46 against displacement.

Due to the force of the torsion spring, relative movement between the bar 34 and handle 35 is prevented until the tension of the clamp band 13 exceeds the tension of said spring. When this occurs, the handle pivots counterclockwise relative to the bar so as to move the flange 41 of said handle away from the lug 44 of said bar and thereby permit the application of a predetermined torque to the clamp band. The amount of the torque to be applied may be varied by changing the tension of the torque spring. Indicia 49 and 50 may be inscribed on the handle adjacent the lug 44 to denote the preferred minimum and maximum torque so as to ensure that the tightened clamp band has sufficient tension to prevent accidental loosening and displacement of the clamp without exceeding the yield strength of said band.

The fastener 24 functions as a spring-pressed dog in holding the clamp 11 against loosening and its lugs 28 ratchet from one pair of perforations 14 to another upon movement of the end portion 15 of the clamp band 13 through the housing 20 by the teeth 39 of the tool 12 to prevent reverse movement of said end portion. As has been explained, the teeth extend through the perforations into the slots 18 of the clamp band when the trunnions 33 are engaged in the slots 32 of the fastener housing to impart relative movement to the perforated end portion of said band upon oscillating or pivotal movement of the tool relative to the clamp. The clamp is tightened by relative counterclockwise oscillation of the tool and loosened by relative clockwise pivoting of said tool.

The foregoing description of the invention is explanatory thereof and various changes in the size, shape and materials, as well as in the details of the illustrated construction may be made, within the scope of the appended claims, without departing from the spirit of the invention.

What I claim and desire to secure by Letters Patent is:

1. A clamp assembly including a flexible band having perforations in one of the end portions thereof, a housing mounted on and projecting outwardly from the other of the end portions of the band and having opposed open ends to permit the perforated end portion of said band to extend therethrough, fastening means pivotally supported within the housing and biased into engagement with the perforations of said perforated band end portion to fasten said band around an article, a tool for tightening and loosening said band, cog means rigidly fixed on one of the ends of the tool for engaging said perforations of said band to impart longitudinal movement to the perforated band end portion upon pivotal movement of said tool, and coacting means on said housing and tool for detachably and pivotally supporting said tool with its cog means in engagement with said perforations, the coacting means comprising opposed open ended slots formed in said housing and opposed trunnions formed on said one end of said tool closely adjacent said cog means and adapted to be slidably received by the housing slots, said housing having an opening in its top adjacent said slots and adapted to receive a portion of said one end of said tool and permit limited pivotal movement of said tool about the axis of its trunnions, the opening of the housing top having an inner transversely extending edge for limiting pivotal movement of said tool whereby rotation of said tool about the edge of said opening causes said trunnions to slide outwardly of said slots to facilitate disengagement of said cog means from said band perforations.

2. A clamp assembly adapted to be actuated by a tool including a flexible band having at least one longitudinal row of perforations in one of the end portions thereof, a housing mounted on the other of the end portions of the band and having opposed open ends to permit the perforated end portion of said band to extend therethrough in overlying relation to said other of said band end portions, the housing having a base wall secured to said other band end portion and a top wall connected to the base wall in overlying relatively close spaced relationship by relatively shallow opposed side walls whereby said housing projects a minimum distance from said band, a pin extending transversely between the side walls at one of the ends thereof in substantially parallel relation to said base and top walls, an angular detent pivotally supported by the pin in spaced relation to said base and top walls and having an outer leg projecting from one end of said housing to permit manual manipulation of the detent, an inner leg extending at an angle to the outer leg of said detent toward said base wall and having a lug projecting downwardly therefrom for engagement with the perforations of said perforated band end portion to fasten said band around an article, and a spring wound around the pin and having end portions bearing against the undersides of the top wall of said housing and of said outer detent leg for biasing the lug of the inner leg of said detent into engagement with said perforations, said outer detent leg being spaced from said top wall whereby said detent is under constant spring tension, said housing substantially enclosing said detent except for its outer leg, said top wall having its end portion opposite said pin cut away to expose said perforations and permit access thereto, said side walls having opposed open ended slots in their ends opposite said pin and inclined outwardly away therefrom, the slots being adjacent the top wall cut away end portion for slidably receiving and pivotally supporting the tool in actuating relationship to said perforations.

3. A clamp assembly as set forth in claim 2 including the tool for tightening and loosening the band, opposed trunnions projecting laterally from one of the ends of said tool for slidable engagement and disengagement with the opposed slots of the housing side walls to pivotally support said tool, a series of cogs rigidly fixed on said one end of said tool for projecting through the cut away end portion of the housing top wall into engagement with the perforations of said band to impart longitudinal movement to the perforated end portion of said band upon pivotal movement of said tool, the cogs being disposed in an arc about the axis of the trunnions and in close proximity thereto, said cut away end portion of said portion of said housing top wall being of sufficient length to accommodate a portion of said one end of said tool and permit pivotal movement of said tool whereby said cogs remain engaged with said perforations during such movement.

4. A clamp assembly including a flexible band having perforations in one of the end portions thereof, a housing mounted on the other of the end portions of the band and having opposed open ends to permit the perforated end portion of said band to extend therethrough, fastening means pivotally supported by the housing and biased into engagement with the perforations of said perforated end portion to secure said band around an article, a tool for tightening and loosening said band, cog means on one of the ends of the tool for engaging the perforations of said band, and coacting means on said housing and tool for pivotally supporting said tool with its cog means in engagement with said perforations, said tool including a pair of members pivotally connected to each other with said cog means being mounted on one of the members and the other of said members functioning as a handle, the handle member being biased relative to the cog means member in a direction opposite the direction of movement of said tool required to tighten said band so as to permit a predetermined torque to be applied to said band whereby the tightened band has sufficient tension to prevent accidental loosening and displacement thereof.

5. A clamp assembly including a flexible band having perforations in one of the end portions thereof, a housing mounted on the other of the end portions of the band and having opposed open ends to permit the perforated end portion of said band to extend therethrough, fastening means pivotally supported by the housing and biased into engagement with the perforations of said perforated end portion to secure said band around an article, a tool for tightening and loosening said band, cog means on one of the ends of the tool for engaging the perforations of said band, and coacting means on said housing and tool for pivotally supporting said tool with its cog means in engagement with said perforations, said tool including a handle having spring pressed pivotal connection with said cog means, said cog means being urged relative to the handle in the direction required to tighten said band so as to permit the application of a predetermined torque to said band whereby the tightened band has sufficient tension to prevent accidental loosening and displacement thereof.

References Cited by the Examiner
UNITED STATES PATENTS

| | | | |
|---|---|---|---|
| 117,882 | 8/1871 | Havell | 24—170 |
| 318,012 | 5/1885 | Merritt. | |
| 376,055 | 1/1888 | Hopkins et al. | |
| 1,463,798 | 8/1923 | Clary | 24—273 |
| 1,627,776 | 5/1927 | Haumerson | 24—68 X |

FOREIGN PATENTS

| | | |
|---|---|---|
| 6,938 | 4/1894 | Great Britain. |
| 516,032 | 12/1939 | Great Britain. |
| 60,275 | 10/1947 | Netherlands. |

WILLIAM FELDMAN, *Primary Examiner.*

D. GRIFFIN, *Assistant Examiner.*